M. H. CLEAVER.
FLEXIBLE NON-SKID DEVICE FOR DUAL TIRED WHEELS.
APPLICATION FILED DEC. 22, 1913.
1,160,576.
Patented Nov. 16, 1915.
2 SHEETS—SHEET 2.
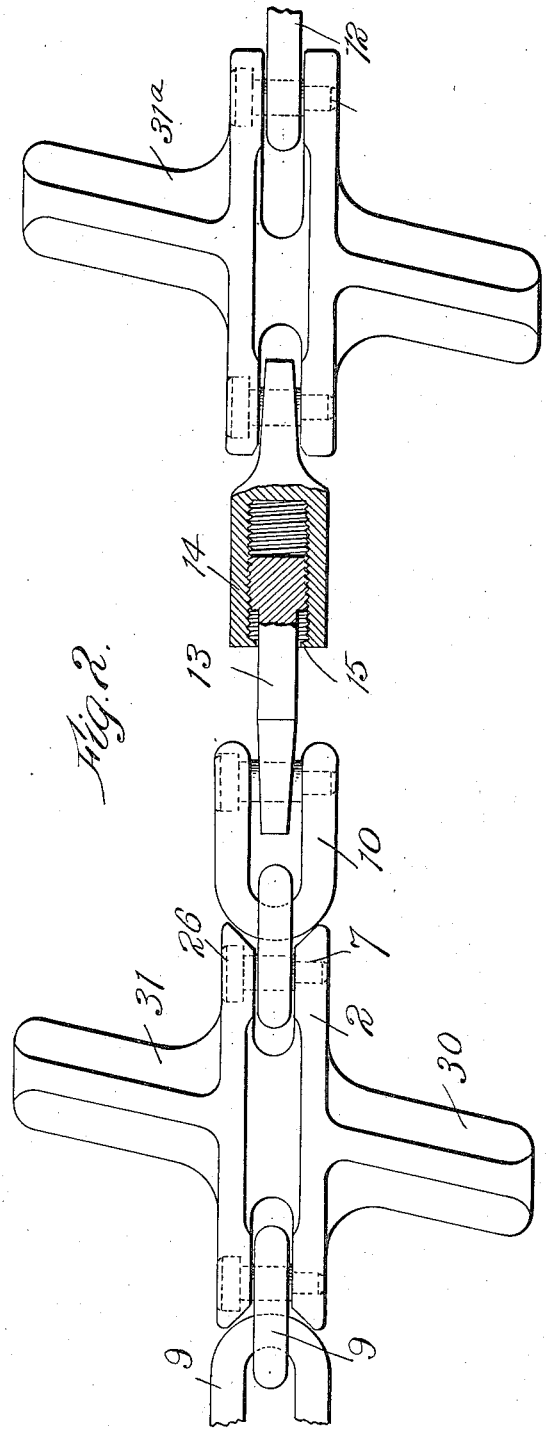
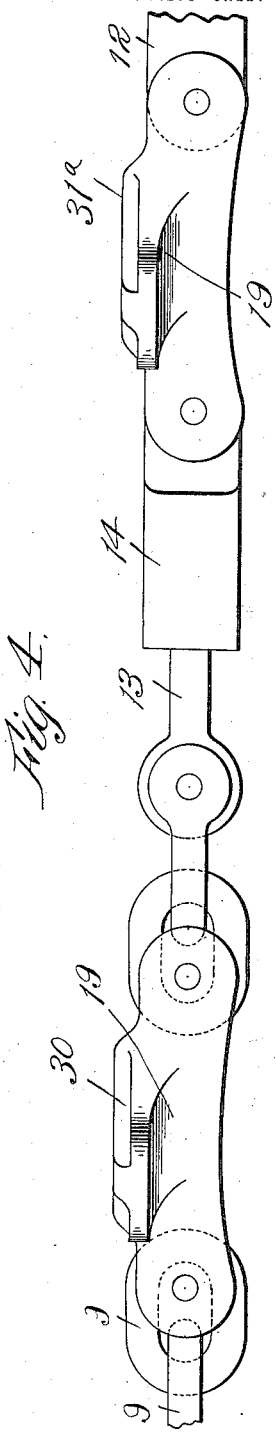

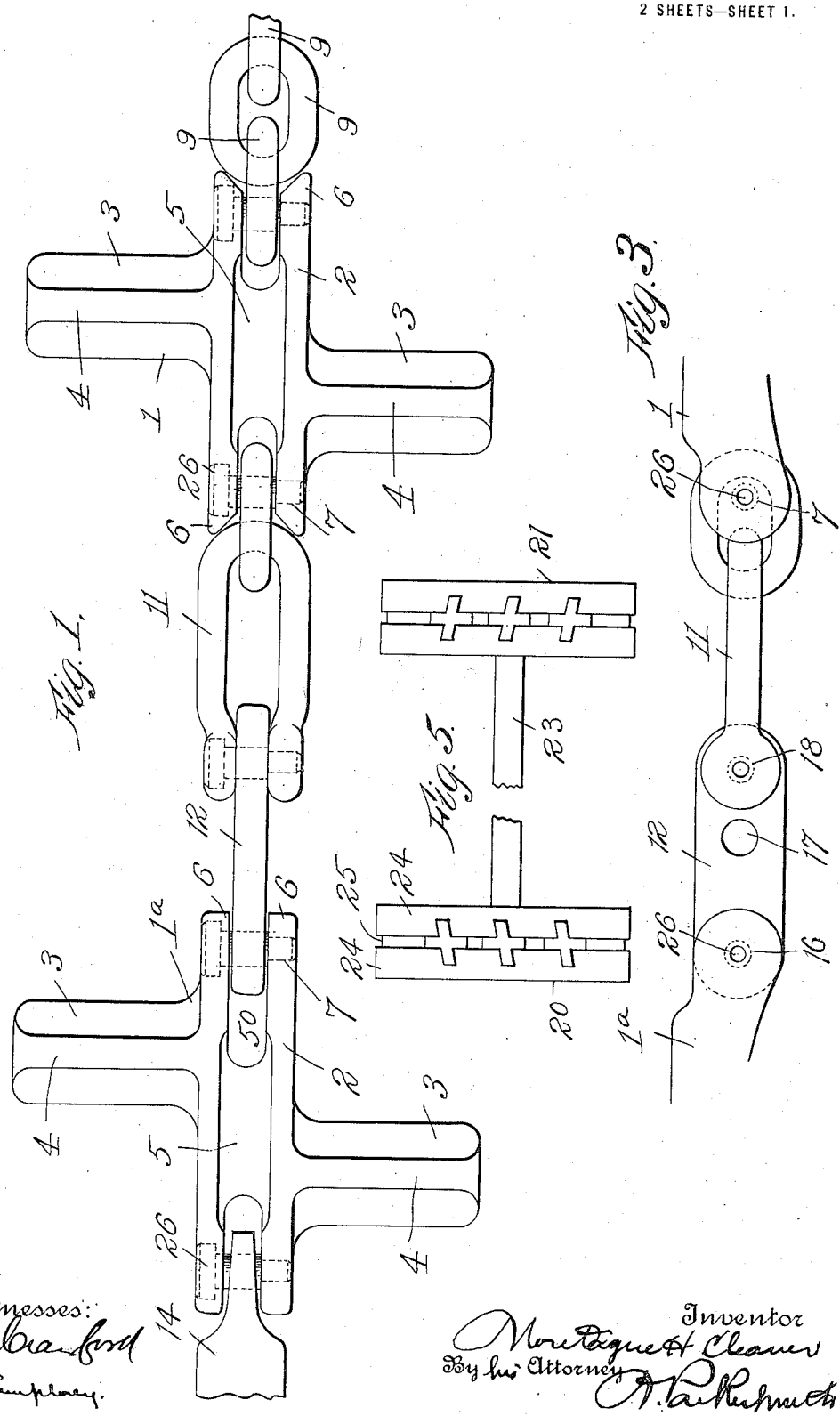

UNITED STATES PATENT OFFICE.

MONTAGUE H. CLEAVER, OF NEW YORK, N. Y., ASSIGNOR TO NEVERSKID MANUFACTURING CO., INCORPORATED, A CORPORATION OF NEW YORK.

FLEXIBLE NON-SKID DEVICE FOR DUAL-TIRED WHEELS.

1,160,576.                   Specification of Letters Patent.      Patented Nov. 16, 1915.

Application filed December 22, 1913. Serial No. 808,237.

*To all whom it may concern:*

Be it known that I, MONTAGUE H. CLEAVER, a subject of the King of Great Britain, residing at New York city, county and State of New York, have invented certain new and useful Improvements in Flexible Non-Skid Devices for Dual-Tired Wheels, of which the following is a specification.

My invention relates to devices for preventing the skidding of the traction wheels of self-propelling vehicles and is particularly designed to prevent the dual tired wheels of heavy motor trucks from spinning around without tractive effect when the truck is operating on roads covered with snow and ice. Under such conditions the fine particles of snow and ice become embedded in the surfaces of the rubber tires, and lodge between the tires and the inner surfaces of the shoes forming parts of the non-skid device, with the result that there is a tendency for the shoe immediately at and before the point of contact between the wheel and the road-bed to form a slippery inclined surface which the rubber tired wheel is unable to mount, but slips around on the same with the result that the truck remains stationary, while the traction wheel spins around idly within the surrounding chain of non-skid devices which also remains stationary. My invention overcomes this difficulty by providing a series of shoes held about the wheel by flexible, easily adjustable connections together forming a chain which grips the wheel firmly by reason of fitting it tightly and binding thereon, and by reason of the cross arms of the shoes being staggered or arranged obliquely, so that the full pressure of the wheel comes first on one end and then on the other end of each cross arm. This operates to embed each cross arm deeply in that one of the two rubber tires resting on the end of the cross arm at the point of tangency of wheel and road-bed.

The best form of apparatus at present known to me, embodying my invention is illustrated in the accompanying two sheets of drawings in which, Figure 1, is a detail view of a portion of the chain of shoes showing the preferred form thereof. Fig. 2, is a similar view showing a modified form of shoe, and with parts of the connecting links shown in section. Fig. 3, is a side elevation of a portion of Fig. 1, Fig. 4, is a side elevation of Fig. 2, and Fig. 5, is a diagrammatic view showing the preferred manner of applying one form of my invention to the two traction wheels of a dual tired motor truck.

Throughout the drawings like reference numbers indicate like parts.

1, indicates generally one of the standard forms of shoes constituting a part of my invention. 1$^a$, represents a special shoe to which the parts of the adjustable take-up device are connected. This shoe 1$^a$, is similar to shoe 1, except that the recess formed at at least one end is made somewhat deeper than in the case of the other shoes, as shown at 50, Fig. 1. A series of shoes are connected together by flexible connecting means such as a series of three or more ordinary chain links 9, 9, and these, with the adjustable connections hereinafter to be described, form an endless band surrounding the wheel and quite closely enveloping the same.

The dominating feature of the novel form of shoe here shown consists in the fact that, while of the general cruciform shape which I have heretofore used and shown for instance in my application, Serial No. 723,048 filed Sept. 30, 1912, having a longitudinally extended body portion 2, which is adapted to fit closely into the groove 25, between the dual tires 24, 24, of the traction wheels, the cross arms 3, 3, instead of extending outward from the body portion opposite to one another are slightly staggered or inclined so that the portion of the cross arm on one side of each shoe is slightly offset from that on the other side of the shoe.

In the modified form of shoe 31, shown in Fig. 2, the cross arms 30, are not only slightly offset one from another but are also arranged obliquely to the body portion 2, of the shoe.

In either case the cross arms are curved on their under faces, as shown at 19, Fig. 4, to fit closely to the curved cross section of the elastic tires 24, 24. Also in either case the cross arms preferably have ribs 4, 4, formed on their outer surfaces and extending longitudinally and medially thereof. Preferably also the body 2, of each shoe has a central depressed portion 5, which forms two side ridges or ribs extending longitudinally in line with the ears 6, 6, projecting at each end of the body 2. These ears 6, 6, are perforated, as indicated at 7, to receive pins 26, 26, indicated in dotted lines, or other fastening devices which may serve as pivot connections between the shoes and the links of the flexible connecting chain. Preferably I employ with this flexible chain connection a special form of take-up device which is the same for either form of shoe and consists of two portions: First, there is a shackle link 10, connected to a turn-buckle which turn-buckle is pivoted to one side of shoe 1ª, or 31ª. Said turn-buckle comprises the threaded member 13, pivoted to the shackle 10, and having a projecting screw thread formed upon its other end which meshes with the internal thread on the hollow member 14, pivoted to the shoe 1ª, or 31ª. This hollow member 14, has a lip or projection 15, at its mouth which may be peened or turned over after the parts are assembled, all as shown in Fig. 2, so as to absolutely prevent the complete withdrawal of the member 13. Second, there is a flat take-up link 12, pivoted to the other end of shoe 1ª, or 31ª, which link 12, has three or more perforations 16, 17 and 18, and which is pivoted to the shoe 1ª, or 31ª, about a pin passing through the end perforation 16, and to the shackle 11, by a pin passing through one of the holes 17, or 18, as may be desired.

Fig. 5, illustrates diagrammatically two traction wheels 20, and 21, mounted on an axle 23, and having my improved non-skid chains mounted thereon.

In operation the necessary number of shoes and intermediate sections of chain are connected together to form a ring long enough in circumference to go around the wheel with the curved end faces 19, of the shoes resting on the faces of the elastic tires 24, 24, and the flexible connecting portions between the shoes resting in the groove 25, between said tires. The chain is tightened up so as to fit quite snugly, there being just sufficient slack to permit of the creeping action of the chain around the wheel but not sufficient to permit the apparatus to slip over either one of the tires and so get off the wheel. This degree of tightness may be preserved at all stages of wear of the tire by reason of the adjustable take-up device above described. As the chain begins to loosen the slack is taken up by removing one of the pivot pins holding either the solid member 13, or the hollow member 14, of the turn-buckle, and screwing up the turn-buckle far enough to take up the slack. When the turn-buckle has taken up all the slack possible, it is at the next take-up operation let out as far as the lip 15, will permit the member 13, to be withdrawn from the member 14, and the slack thus secured permits of removing the pin connection between the shackle 11, and the take-up link 12, from one hole 18, to the next hole 17. Thereafter the operation of taking up with the turn-buckle may be repeated. The space between any two take-up holes 17, and 18, should be approximately equal to the maximum amount of adjustment possible in the turn-buckle. Thus a continuous take-up action and also a step by step take-up action are rendered possible.

The device being securely held upon the wheel in the manner above described, it is evident that its flexible character will cause it to hug the wheel and present a maximum resistance of friction to any tendency of the wheel to spin inside the device. Also, the chain sections between the shoes, tending to assume a straight line position between the shoes, (this being rendered possible by their sinking into the groove 25, between the tires,) exert an effective pull or strain upon the shoes along lines which are at an angle to the surfaces of the tires and shoes at the points of contact, whereby the frictional resistance of the shoe to movement on the tire is increased. Finally, the staggered or oblique position of the cross arms causes one arm to reach the position of tangency between the tire above it and the road-bed below it a little before the other arm on the same shoe reaches such point of tangency. Accordingly, the entire weight on that wheel is exerted first on the tire resting on the advance cross arm of the shoe and presses said tire down upon the end of that cross arm embedding the end of the shoe arm in the tire to a greater extent than would occur if the weight were distributed between both arms of the shoe. If this should require a slight twisting action on the part of the shoe, the flexible connections permit it. A moment later the same action occurs between the other cross arm of the shoe and the other tire of the wheel. This also tends to increase the frictional resistance to slipping between the shoes and the tires. As a result of coaction of these several features of construction a wheel equipped with my invention will rarely spin around within the chain, even in the most unfavorable road conditions as to snow and ice.

In order to prevent the oblique position of the cross arms exerting any side thrust on the vehicle as a whole, when that modification of my invention shown in Figs. 2 and 4, is used, I prefer to arrange the chains as shown in Fig. 5, those upon one wheel being inclined oppositely to those upon the other.

Among the advantages of my invention may be mentioned primarily, the prevention of slipping of the non-skid device over the surface of the wheel or, conversely, the preventing the spinning of the wheel in the non-skid device, and the simple and effective take-up device having, among other features, the lip 15, which prevents accidents by rendering it impossible for an ignorant user to withdraw the member 13, too far from the member 14, of the adjustable turn-buckle, and the reduction of vibration when running on hard pavements, which reduction results from dividing up the impact which would otherwise be created by a shoe embedding itself in both tires of a wheel at the same time, into two lesser impacts as each staggered cross arm separately embeds itself in its coöperating tire. Also, when the cross arms extend obliquely to the body portion of the shoe as shown in Figs. 2, and 4, one end of each cross arm comes into engagement before the middle portion and this gradual compression of the cross arm between the tire and the road-bed tends further to reduce vibration, and to heighten the gripping action of the shoe on the elastic tire.

Having described my invention, I claim:

1. In a non-skid device for double tired wheels the combination of a series of shoes each having a tread of general cruciform shape, said shoes being adapted to fit in between the tires and extend over the faces thereof, the cross arms extending over the tire faces being staggered so that those resting on one tire are offset from those resting on the other tire, with chain connections for said shoes adapted to lie in the grooves between the tires.

2. In a non-skid device for double tired wheels the combination of a series of shoes each having a tread of general cruciform shape, said shoes being adapted to fit in between the tires and extend over the faces thereof, the cross arms extending over the tire faces being staggered so that those resting on one tire are offset from those resting on the other tire, with connections between the shoes flexible in every direction at right angles to said connections.

3. In a non-skid device for double tired wheels, the combination of a series of shoes each having a tread of general cruciform shape, said shoes being adapted to fit in between the tires and extend over the faces thereof, the cross arms extending obliquely over the tire faces and being staggered by reason of such oblique arrangement so that those resting on one tire are offset from those resting on the other tire, with connections between the shoes flexible in every direction at right angles to said connections.

MONTAGUE H. CLEAVER.

Witnesses:
    EDWIN D. GREENE,
    SIDNEY V. MORRIS.